No. 728,245. PATENTED MAY 19, 1903.
R. KRAYN.
COPYING MATERIAL FOR PHOTOGRAPHIC PURPOSES.
APPLICATION FILED JULY 14, 1902.
NO MODEL.

Witnesses
Norris H. Clark.
Geo. M. Copenhaver.

Inventor
Robert Krayn.
by Alexander & Co.,
Attorneys

No. 728,245. Patented May 19, 1903.

UNITED STATES PATENT OFFICE.

ROBERT KRAYN, OF BERLIN, GERMANY.

COPYING MATERIAL FOR PHOTOGRAPHIC PURPOSES.

SPECIFICATION forming part of Letters Patent No. 728,245, dated May 19, 1903.

Application filed July 14, 1902. Serial No. 115,470. (No specimens.)

*To all whom it may concern:*

Be it known that I, ROBERT KRAYN, a subject of the Emperor of Germany, residing at 36-37 Chausséestrasse, Berlin, N., Germany, have invented a new and useful Copying Material for Photographic Purposes; and I do hereby declare the following to be a full, clear, and exact description of the same.

Figure 1:
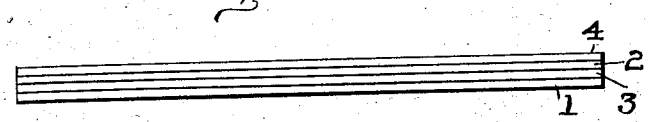
Figure 2:
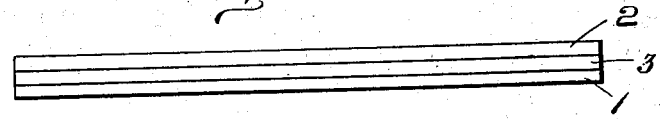

In the accompanying drawings, Figure 1 is a view of the film with its exterior coating applied, and Fig. 2 is a view of the film before the coating has been applied.

My invention relates to an improved copying material for the so-called "pigment process."

It consists of thin transparent leaves 1, of celluloid, mica, or the like, upon which gelatin 2, preferably mixed with color and bichromated, has been applied to form a transferable layer. The transferable quality of the layer of gelatin is secured, by means of an under layer 3 of rubber, &c., in the manner already well known in the photographic industry. The use of the new material is effected in such a manner that the chromated pigment-foils are placed in the copying-frame from behind under a negative, and consequently are exposed through the thin layer of celluloid and through the under layer of rubber and are then placed in warm water. After a few minutes there is thereby produced the pigment-picture without any transfer. The picture thus directly produced possesses in consequence of the under layer of rubber or the like the quality of a photographic transfer-picture in pigment which can then be transferred to any other surface desired. In order to render the transfer more certain, it is advisable to provide either the pigment-picture or the transfer material with an adhesive coating 4 of gelatin or the like in like manner as is necessary with the ordinary double transfer with pigment-paper. In this manner a right-sided pigment-picture is obtained without the use of a reversed negative. The celluloid foil on the new copying material may possess a coating of from 0.05 to 0.25 millimeter, and this without causing any loss of definition from the copying through the back.

It is obvious that by means of the above-described new material also polychrome photographic pictures can be produced upon paper by taking the separate monochrome pictures successively and superposing them upon one and the same piece of paper.

Instead of gelatin may obviously be used other organic substances which are soluble in cold water—such, for instance, as gum-arabic, sugar, starch, dextrin, &c., or mixtures thereof.

Having thus fully set forth my invention, what I claim is—

1. A copying material for the so-called pigment process consisting of a film of transparent material, a film of gelatin or its equivalent, and a layer of rubber or its equivalent interposed between the two films aforesaid.

2. A copying material for the so-called pigment process, consisting of a film of transparent material, a layer of rubber or its equivalent superposed thereon, a film of gelatin mixed with color superposed on the rubber, and an exterior coating of gelatin.

In testimony whereof I have signed this specification in the presence of two subscribing witnesses.

ROBERT KRAYN.

Witnesses:
- HENRY HASPER,
- WOLDEMAR HAUPT.